United States Patent [19]

Scott

[11] Patent Number: 5,081,626
[45] Date of Patent: Jan. 14, 1992

[54] SYSTEM FOR DETECTION AND LOCATION OF EVENTS

[75] Inventor: Edward W. Scott, Anaheim Hills, Calif.

[73] Assignee: Hughes Aircraft Company, Los Angeles, Calif.

[21] Appl. No.: 448,029

[22] Filed: Dec. 8, 1989

[51] Int. Cl.⁵ ............................................. G06F 11/26
[52] U.S. Cl. ................................. 371/22.4; 371/25.1; 371/22.1
[58] Field of Search ..................... 371/22.4, 25.1, 22.1

[56] References Cited

U.S. PATENT DOCUMENTS

| | | | |
|---|---|---|---|
| 3,976,864 | 8/1976 | Gordon et al. | 235/153 |
| 4,192,451 | 3/1980 | Swerling et al. | 371/20 |
| 4,194,113 | 3/1980 | Fulks et al. | 371/20 |
| 4,320,509 | 3/1982 | Davidson | 371/22.4 |
| 4,433,413 | 2/1984 | Fasang | 371/25 |
| 4,441,074 | 4/1984 | Bockett-Pugh et al. | 324/73 |
| 4,503,536 | 3/1985 | Panzer | 371/25 |
| 4,510,572 | 4/1985 | Reece et al. | 364/489 |
| 4,745,355 | 5/1988 | Eichelberger et al. | 324/73 |
| 4,897,842 | 1/1990 | Herz et al. | 371/22.4 |

OTHER PUBLICATIONS

Gordon et al., Hexadecimal Signatures Identify Troublespots in Microprocessor Systems, Mar. 1977.

Primary Examiner—Jerry Smith
Assistant Examiner—Russell E. Cass
Attorney, Agent, or Firm—Wanda K. Denson-Low

[57] ABSTRACT

A detector and locator system monitors sequential signals to detect and locate events. In a fault detector and locator embodiment, the system monitors the sequential states of multiples signals to detect a fault and to locate the source of a fault. A Hamming encoder compresses the sequential signal to reduce the number of signature generators. Signature generators further compress the encoded signals to reduce an enormous number of states contained in the sequence of monitored signals to a relatively small set of signatures. A parity detector monitors the signature signals to generate a fault detection signal. A location circuit monitors the signature signals to generate a fault location signal.

23 Claims, 3 Drawing Sheets

SYSTEM FOR DETECTION AND LOCATION OF EVENTS

BACKGROUND

The present invention relates generally to performance monitoring and fault detection and location systems and more particularly, to systems for rapid and reliable detection and location of faults in electronic digital systems.

One of the oldest prior art fault detection methods is the parity check. More recently, the parity check has been combined with signature circuits. However, such prior art systems are not able to detect all simultaneous combinations of faults and are not able to locate faults that are detected. The inability to locate faults is tolerable for "hard" faults or permanent faults that persist. This is because operation of the system can be discontinued for trouble shooting and a "hard" fault can be traced, such as by signal tracing with an oscilloscope or logic analyzer. However, this inability to locate faults is not tolerable for "soft" faults or transient faults that occur and then go away because, by the time the signal can be traced, the "soft" fault is no longer present. Further, this inability to locate faults is not tolerable for "glitch" tracing because a "glitch" is a short transient condition that occurs and then goes away before it can be traced using prior art fault location methods.

Prior art performance monitoring circuitry has been implemented with a parity circuit to combine many monitored signals into a single parity signal and with a single signature circuit to detect a fault in response to the parity signal. Such systems can detect odd combinations of simultaneous faults, such as one simultaneous faults or five simultaneous faults, but cannot detect even combinations of faults, such as two simultaneous faults or six simultaneous faults. Alternatively, such systems can detect even combinations of simultaneous faults, but cannot detect odd combinations faults. Further, although such systems can detect faults, they cannot locate faults. Hence, time consuming manual signal tracing is conventionally used to locate a fault after being detected by such systems.

Accordingly, it is a feature of the present invention to provide a fast fault localization system that is applicable to any digital sequential circuitry. Another feature of the invention is the provision of a fast fault localization system that detects even multiples of faults. A further feature of the present invention is to provide a fast fault localization system that detects intermittent problems such as noise-induced errors. Yet another feature of the invention is the provision of a fast fault localization system that captures information about the location of a problem at the same time that it detects the fault.

SUMMARY OF THE INVENTION

In accordance with these and other features of the invention, there is provided a fast fault localization system in which monitored input signals are combined into a Hamming code. The Hamming code bits are fed into signature generator circuits. Each signature generator circuit forms a separate fault localization word. Each fault localization word is compared to a known reference value. A "gross error" performance monitoring word is formed by combining all of the fault localization words. This is achieved by using parity generators. The performance monitoring word uses parity equations skewed by one bit position to enhance fault detection capabilities.

In a preferred embodiment, an event locating system comprises an input circuit for generating a plurality of input signals each having a sequential plurality of input signal states, a plurality of signature circuits each generating an input signature number in response to the sequential plurality of input signal states of a related one of the plurality of input signals generated by said input circuit, a reference circuit for generating a plurality of reference signature numbers, a comparator circuit for generating each of a plurality of comparator signals by comparing one of the input signature numbers generated by one of said plurality of signature circuits with a related one of the reference signature numbers generated by said reference circuit, and a location circuit for locating an event in response to the plurality of comparator signals generated by said comparator circuit.

BRIEF DESCRIPTION OF THE DRAWINGS

The foregoing and other features and advantages of the present invention will become apparent from the following detailed description taken in conjunction with the accompanying drawings, wherein like references numerals designate like structural elements, and in which.

DETAILED DESCRIPTION

Figure 1:
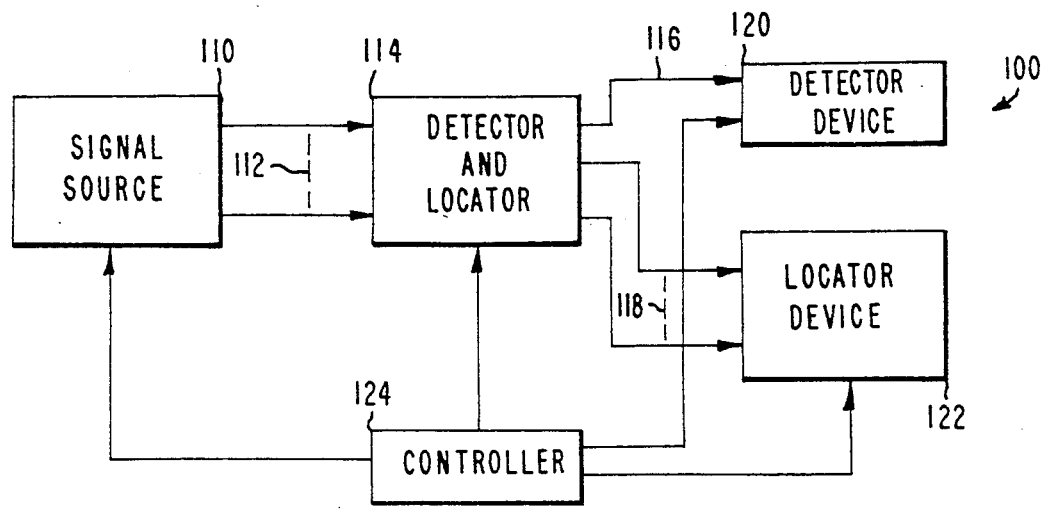
FIG. 1 is a block diagram representation of a detection and location system in accordance with the principles of the present invention.

The present invention is applicable to detection and location systems in general and to fault detection and location systems in particular. It is particularly suitable for on-line monitoring of digital systems involving sequences of operations, such as in state machines. It is usable in digital systems in general, ranging from performance monitoring systems and fault detection and location systems to fire control systems and guidance and control systems.

General information on prior art fault detectors may be found in the articles "Digital Troubleshooting With Signature Analysis" by Piubeni in the September 1982 issue of Byte magazine and "Fast Error-Correcting ICs Aid Large Memory Systems" by Rajpal and Mick in the Feb. 19, 1987 issue of Electronic Design magazine, along with U.S. Pat. No. 4,435,807 and U.S. Pat. No. 4,630,272.

The present invention provides a new and improved way to detect and to locate events. It is particularly suitable for detecting and locating events occurring at high speed and having a transient or "soft" nature or "glitch" nature. Hence, it is clearly within the capability of the present invention to provide the simpler capabilities of detecting events at low speed, detecting permanent or "hard" events, locating events at low speed, and locating permanent or "hard" events. Further, it is within the capability of the system to detect and to locate events while the system is operating.

Well known electronic digital systems are implemented as state machines operating to generate multiple signals having sequences of states. For example, digital circuits typically have memory elements, such as flip-flops, and typically have logic gates. The memory elements store system conditions or states. The logic gates and memory elements are used to generate signals having logical one and logical zero states. As the operation of the system progresses, the states of the signals change, generating a sequence of states or conditions. An event may be a state of one signal or a combination of states of various signals. System operation can result in hundreds of output signals each having millions of sequential states. A fault can occur in a single bit of a single signal. In order to detect such a fault, a test circuit might have to monitor and check each and every one of the enormous number of states. Compressed checking codes have been developed, such as the well known parity check. Well known correcting codes have been developed to correct errors. However, on-line locating of the source of the error is an even more complex task that has not been effectively achieved in the prior art. The present invention provides an efficient arrangement and method for checking enormous quantities of states, determining if a fault exists, and identifying the location of the fault. Other events, other than faults, can be detected and located with the system of the present invention. For example, in a fire control system, a target event can be detected and located in a radar image.

Electronic digital systems are conventionally designed to sequence through various states and to perform operations in those states, such as in a stored program digital computer executing a sequence of instructions. If the initial conditions are the same for each of a plurality of iterations, such as the parameters in the computer registers being processed by the sequence of instructions, and if the operations are the same for each iteration, such as the sequence of instructions being executed, then the sequence of states of each signal will be the same for each iteration. Hence, the sequence of states can be recorded for the condition of faultless operation (i.e., a reference) and the recorded sequence of states can be compared to a subsequently generated sequence of states (i.e., a test run) to detect and to locate a fault. a fault can be detected by finding a difference between the recorded faultless sequence of states and the generated sequence of states. A fault can be located by identifying the signal having the fault. However, such a configuration would involve an enormous storage capacity to store all of the sequences of states and an enormous comparison capability to compare all of the sequences of states to detect and to locate a fault.

Various data compression arrangements are provided in accordance with the present invention to reduce the required storage capacity and to reduce the required comparison capability for fault detection and location. In a first configuration, each one of a plurality of input signals being monitored are input to a signature circuit to generate a signature number that is indicative of the sequence of states of the input signal. In a second configuration, each one of a plurality of signals being monitored are encoded to reduce the quantity of input signals and each one of the encoded signals are then input to a signature circuit to generate a signature number that is indicative of the sequence of states of the encoded signal. The encoder can be a Hamming encoder and the signature circuit can be a shift register having feedback and exclusive-OR summing. Other encoders and signature circuits can be used. In either configuration, the numbers generated by the signature circuits are indicative of the sequence of input states of the related signals. Storage of reference signature numbers related to faultless operation and comparison of the reference signature numbers with the corresponding test signature numbers obtained from a test run will indicate a faultless test for a perfect comparison therebetween and will indicate a fault or combination of faults for a non-comparison condition therebetween. The location of the fault is indicated by the combination of signature signals having non-comparison conditions.

Figure 2:
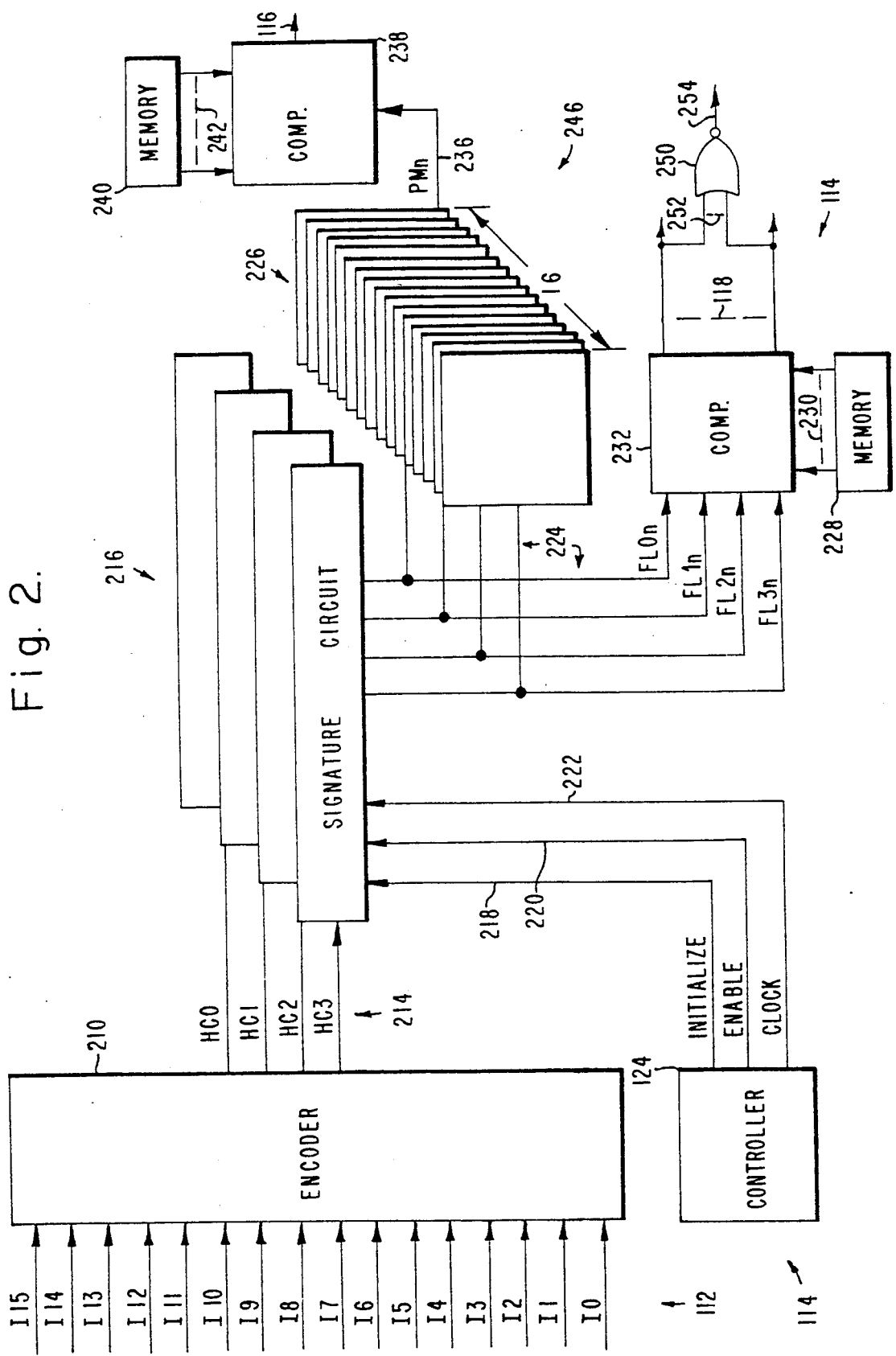
FIG. 2 is a detailed diagram of the detection and location circuits of FIG. 1.

FIG. 1 is a block diagram of a detector and locator system 100 having a signal source 110 generating a single signal or a plurality of signals 112 each having a sequential plurality of states. For example, each signal 112 can have a sequence of digital bits in a sequential pattern. Detector and locator circuit 114 processes the signals 112 to generate one or more detector signals 116 indicative of detection of an event and one or more location signals 118 indicative of location of an event. An event detector device 120 and an event location device 122 process the detector signal 116 and the location signals 118, respectively. For example, the event detector device 120 can be a red fault light to alert an operator to detection of a fault and the event location device 122 can be a numeric display to identify the location of the fault to an operator. Controller 124 can be implemented to generate clock signals 222 to control operation of the signal source 110, the detector and locator circuit 114, the event detector device 120, and the event locator device 122, can be used to clear or otherwise initialize the signal source 110 and the detector and locator circuit 114 with initialize signal 218 prior to initiating a test run, and can be used to enable a test run with enable signal 220 (FIG. 2). Such controller circuits are well known in the art.

FIG. 2 is a detailed diagram of detector and locator circuits 114 in accordance with the present invention. The FIG. 2 configuration provides single point of failure fault localization for 16 monitored signals 112 (the second configuration above). The 16 monitored input signals are compressed to a 4-bit Hamming Code 214. Each of these four Hamming Code bits are processed by a different one of four signature circuits 216. At the conclusion of a test run, the signature words 224 in each one of the signature circuits define if a fault has occurred and, if so, the location of the fault. Other configurations can provide detection and location for multiple points of failure by using a larger Hamming encoder 210 and a corresponding larger number of signature circuits 216. In the limit, eliminating the Hamming encoder 210 and monitored each input signal with a dedicated signature circuit 216 (the first configuration above) permits detection and location of all of multiple points of failure.

The encoder 210 encodes the monitored input signals 112 to generated the encoded signals 214. In a preferred embodiment, encoder 210 is a Hamming encoder for encoding the monitored input signals 112 to generated the encoded signals 214 having a Hamming code relationship with the monitored input signals 112. The encoded signals 214 are input to signature circuits 216 for generating signature numbers related to the sequence of encoded signals 214. In this example, 16 input signals 112 are processed by a Hamming encoder 210 to generate four encoded signals 214 which are each input to a corresponding one of four signature circuits 216. Each of the signature circuits 216 generates a signature number 224 (16 bits in this example) having a value related to the sequence of states of the encoded signals 214. The value of the signature numbers 224 can be processed by a detector circuit 226 to detect a fault. The value of the reference signature numbers 230 for a faultless test can be stored in a memory 228, such as digital registers, for comparison with the signature numbers 224, such as using comparator circuits 232. The output signals 118 from comparator circuits 232 can be used to determine the location of a fault that is detected.

Many encoder configurations, such as Hamming encoders, can be used to implement encoder 210. The monitored input signals 112 can be compressed into a Hamming code 214 by a Hamming encoder circuit 210. The amount of compression for the presently disclosed Hamming encoder is a binary exponent, where $2^n$ input signals are compressed into n Hamming encoded signals. For example, 16 input signals 112 are compressed into four Hamming encoded signals 214 (FIG. 2) and 512 input signals are compressed into 9 Hamming encoded signals. The Hamming encoder 210 can be expanded to process large numbers of input signals virtually without limit. The Hamming encoder may be considered to be a spatial domain compression circuit, compressing a large number of signal lines into a relatively small number of signal lines. Hamming encoders are well known in the art. Many Hamming encoder configurations can be implemented. For example, Hamming encoders can be implemented to detect single errors or multiple simultaneous errors. Further, Hamming encoders can be implemented to facilitate automatic determination of a no fault condition.

One configuration of a Hamming encoder to detect a no fault condition can be implemented in accordance with the following logical equations.

HC0 = I1 XOR I3 XOR I5 XOR I7 XOR I9 XOR I11 XOR I13 XOR I15

HC1 = I2 XOR I3 XOR I6 XOR I7 XOR I10 XOR I11 XOR I14 XOR I15

HC2 = I4 XOR I5 XOR I6 XOR I7 XOR I12 XOR I13 XOR I14 XOR I15

HC3 = I8 XOR I9 XOR I10 XOR I11 XOR I12 XOR I13 XOR I14 XOR I15

In the above logic equations, the I0 input term is not implemented and hence any fault detection that indicates the I0 term implicitly indicates a no fault condition.

Each one of the encoded signals 214 can be further compressed into a signature number 224 by a signature circuit 216. The signature circuit is initialized to an initial condition signature number and then is clocked to update the initial condition signature number as a function of the sequence of states of the encoded input signal. Each signature circuit may be considered to be temporal domain compression circuit, compressing a large number of time sequential signal states on an encoded signal line 214 into a relatively small number of bits in a signature number 224. The signature numbers 224 generated by the signature circuits 216 identify the location of a fault that may have occurred. Faults are located by comparing each of the signature numbers with reference numbers and assigning zero bits to words that compare and one bits to words that do not compare and concatenated into a fault code. This fault code defines the location of the fault.

The signature numbers can be further compressed into a detection word by detector circuits 226. The detector word PMn 236 identifies the presence of a fault. In one configuration, the detector circuit is implemented with parity circuits which are well known in the art. Alternatively, a fault detector can be implemented by a circuit 250 monitoring location signals 118 in a configuration having a faultless condition, such as implemented with Hamming encoder 210 or such as implemented by connecting one of the signal lines to ground as discussed below.

Figure 3:
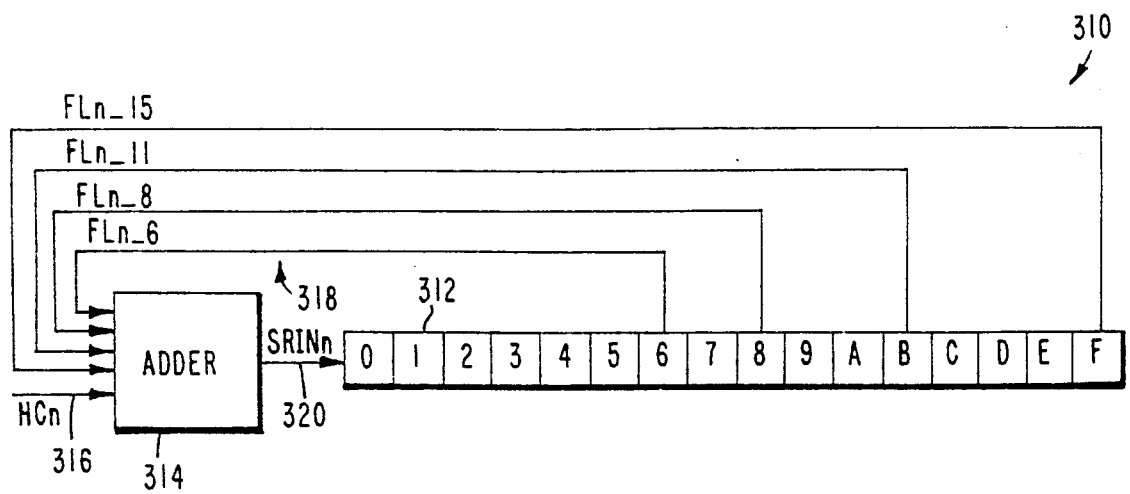
FIG. 3 is a detailed diagram of a signature circuit shown in FIG. 2.

One configuration of a signature circuit 310 that is well known in the art is shown in FIG. 3. It can be used for each of the four signature circuits 216 shown in FIG. 2, where the n in FIG. 3 can be assigned a value of 0 for the first signature circuit for processing signal HC0, a value of 1 for the second signature circuit for processing signal HC1, a value of 2 for the third signature circuit for processing signal HC2, and a value of 3 for the fourth signature circuit for processing signal HC3 (FIG. 2). A shift register 312 stores a signature number. The input signal HCn 316 is processed with adder circuit 314 in response to the feedback signals 318 to generate signature signal SRINn 320 to be shifted back into the shift register 312. The feedback stages are shown as stage 6, stage 8, stage 11, and stage 15 for the FIG. 3 configuration but may be any stages of register 312 in other configurations. Adder circuit 314 may be implemented as a modulo two adder circuit implemented with exclusive-OR circuits using well known methods. One signature circuit is defined by the following logical equation: SRINn = HCn XOR FLn_6 XOR FLn_8 XOR FLn_11 XOR FLn_15.

The logical equations used herein may have a lower case "n" symbol, which means that the equation is one of a plurality of equations or signals and that n = 1 for a first one of the plurality of equations, n = 2 for a second one of the plurality of equations, and so forth. Also, the logical equations used herein may have an underscore "_" symbol followed by a number, which means that the number following the underscore "_" symbol is the line number or bit number associated with one of a plurality of lines or bits for the designated signal or word.

This above general equation for SRINn can be applied to the four signature circuits 216 of FIG. 2 as follows.

SRIN0 = HC0 XOR FL0_6 XOR FL0_8 XOR FL0_11 XOR FL0_15

SRIN1 = HC1 XOR FL1_6 XOR FL1_8 XOR FL1_11 XOR FL1_15.

SRIN2 = HC2 XOR FL2_6 XOR FL2_8 XOR FL2_11 XOR FL2_15

SRIN3 = HC3 XOR FL3_6 XOR FL3_8 XOR FL3_11 XOR FL3_15

When a fault is detected, such as by detector circuits 226, the fault can be located by assigning a zero state to each of the signature numbers that compares with the related reference number, by assigning a one state to each of the signature numbers that does not compare with the related reference number, and by associating the combination of one states and zero states with the input signal as shown in the table below.

| SRIN3 | SRIN2 | SRIN1 | SRIN0 | FAULTY INPUT SIGNAL |
| --- | --- | --- | --- | --- |
| 0 | 0 | 0 | 0 | 10 |
| 0 | 0 | 0 | 1 | 11 |
| 0 | 0 | 1 | 0 | 12 |
| 0 | 0 | 1 | 1 | 13 |
| 0 | 1 | 0 | 0 | 14 |
| 0 | 1 | 0 | 1 | 15 |
| 0 | 1 | 1 | 0 | 16 |
| 0 | 1 | 1 | 1 | 17 |

| -continued | | | | |
|---|---|---|---|---|
| SRIN3 | SRIN2 | SRIN1 | SRIN0 | FAULTY INPUT SIGNAL |
| 1 | 0 | 0 | 0 | 18 |
| 1 | 0 | 0 | 1 | 19 |
| 1 | 0 | 1 | 0 | 110 |
| 1 | 0 | 1 | 1 | 111 |
| 1 | 1 | 0 | 0 | 112 |
| 1 | 1 | 0 | 1 | 113 |
| 1 | 1 | 1 | 0 | 114 |
| 1 | 1 | 1 | 1 | 115 |

Hence, the combination of signature signals that have one states and zero states identifies the input signal having the single point failure. This location is independent of whether the fault is a "hard" fault or a transient fault. For example, if signature numbers 2 and 3 compared with the related reference numbers and numbers 0 and 1 did not compare with the related reference numbers, the location code would be binary number $0011_2$ or the decimal number $3_{10}$. This would identify that input signal three has a fault.

One fault detector configuration implements a faultless condition for input signals 214 and detects the faultless condition with the detector logic 250 in conjunction with the fault location logic. If the faultless condition is detected, the detector indicates the absence of a fault. If the faultless condition is not detected, the detector indicates the presence of a fault. A faultless condition can be implemented in various ways. One way is to implement encoder 210 to generate a faultless condition, such as the faultless condition implementation associated with input signal 10 discussed above with reference to the HC0 to HC3 equations. Another way is to implement the input signals 112 to have a faultless condition, such as by connecting input signal 10 to ground. Detection of the code for the faultless condition; i.e., 0000 for the 10 faultless input signal; is indicative of the absence of a fault condition. Various circuits can be used to detect the fault conditions and faultless conditions on location signal lines 118. For example, a faultless condition 0000 can be detected by a NOR gate 250 generating the faultless condition signal 254. Alternatively, a faultless condition 1111 can be detected by an AND gate generating the faultless condition signal. Alternatively, other circuits can be implemented to detect fault conditions or faultless conditions on location lines 118.

Another fault detector configuration uses detector circuits to monitor the signature signals to detect a fault. One such configuration uses parity circuits 226, memory 240, and comparator circuit 238. Detector 246 is implemented by encoding the input signature signals 224 with detector encoder circuits 226, such as parity circuits, and then comparing the encoded signals 236 with known faultless reference encoded signals 242. Detector 226 can be implemented by many different detector configurations, such as by parity detectors. One configuration of a parity detector is in accordance with the following logical equations.

PM0 = FL0_0 XOR FL1_1 XOR FL2_2 XOR FL3_3

PM1 = FL0_13 1 XOR FL1_2 XOR FL2_3 XOR FL3_4

PM2 = FL0_2 XOR FL1_3 XOR FL2_4 XOR FL3_5

PM3 = FL0_3 XOR FL1_4 XOR FL2_5 XOR FL3_6

PM4 = FL0_4 XOR FL1_5 XOR FL2_6 XOR FL3_7

PM5 = FL0_5 XOR FL1_6 XOR FL2_7 XOR FL3_8

PM6 = FL0_6 XOR FL1_7 XOR FL2_8 XOR FL3_9

PM7 = FL0_7 XOR FL1_8 XOR FL2_9 XOR FL3_10

PM8 = FL0_8 XOR FL1_9 XOR FL2_10 XOR FL3_11

PM9 = FL0_9 XOR FL1_10 XOR FL2_11 XOR FL3_12

PM10 = FL0_10 XOR FL1_11 XOR FL2_12 XOR FL3_13

PM11 = FL0_11 XOR FL1_12 XOR FL2_13 XOR FL3_14

PM12 = FL0_12 XOR FL1_13 XOR FL2_14 XOR FL3_15

PM13 = FL0_13 XOR FL1_14 XOR FL2_15 XOR FL3_0

PM14 = FL0_14 XOR FL1_15 XOR FL2_0 XOR FL3_1

PM15 = FL0_15 XOR FL1_0 XOR FL2_1 XOR FL3_2

In this configuration, the bits are shown skewed by one position to aid in detecting even values.

A detector memory and comparator arrangement can be implemented using memory 240 to generate a reference number 242 to comparator 238 for comparison with detector number 236 (similar to the arrangement discussed with reference to memory 228 and comparator 232 for fault location) to determine if the encoded detector signal 236 compares with the detector reference signal 242. If there is a comparison, a faultless condition is detected. If there is no comparison, a fault condition is detected. The faultless condition and the fault condition are identified with the state of detector output signal 116.

Figure 4:
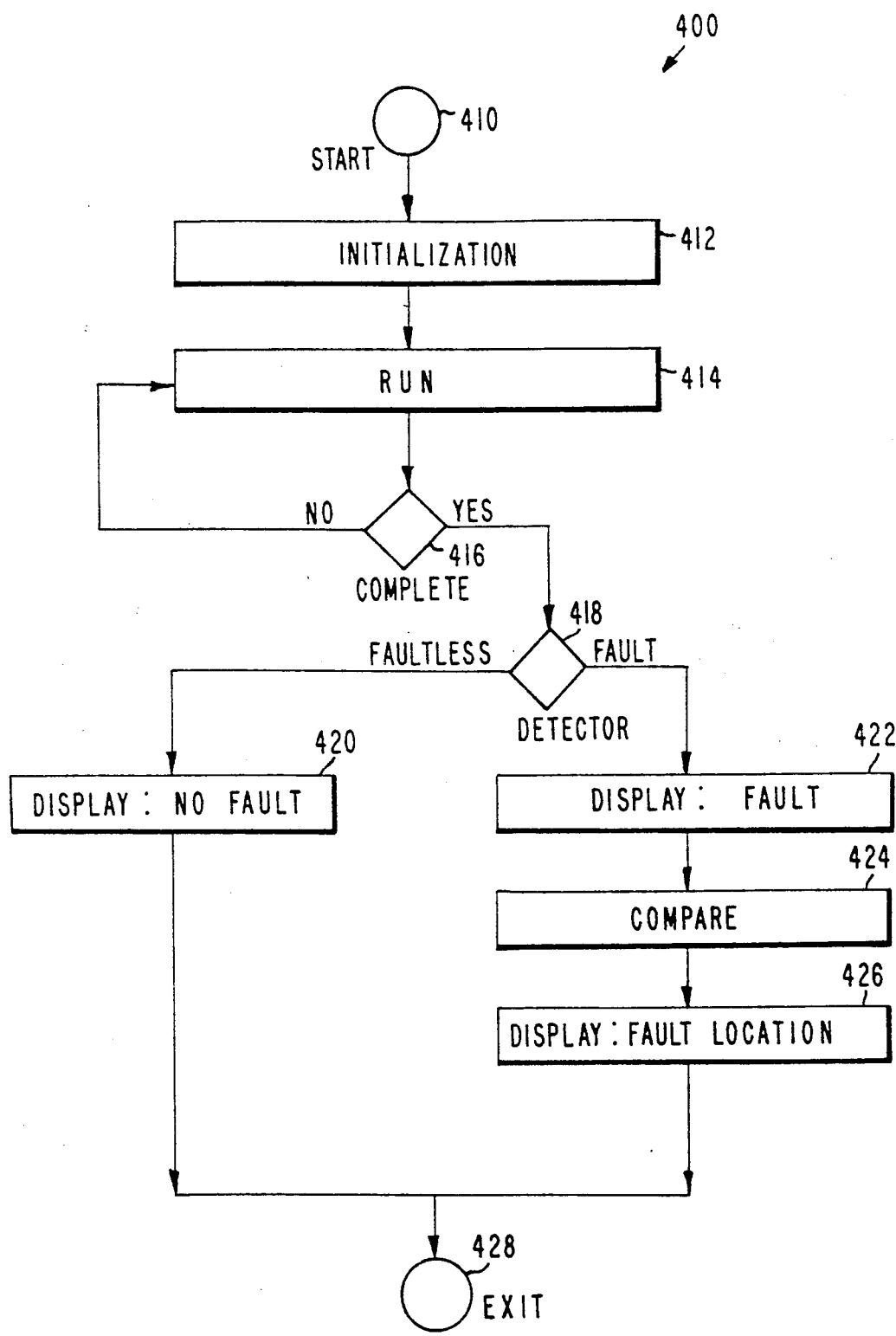
FIG. 4 is a detailed flow diagram of operation of a fault detector and locator embodiment of the present invention.

A flow diagram 400 is shown in FIG. 4 illustrating operation of a fault detection and location embodiment of the present invention. Such a flow diagram can be implemented in software in a stored program computer that is programmed for performing the test, or can be implemented in hardware in a special purpose logical device that is wired for performing the test, or can be implemented in a semiautomatic manner by an operator controlling the test, for example.

System operation starts with operation 410. The system is initialized in operation 412, such as by initializing the signal source 110 to an initial state, initializing the signature circuits by loading initial signatures, and loading reference signatures into memory 228. The system is then controlled to run in operation 414, looping back along the NO path from test 416 if operation is not complete and exiting from the run condition along the YES path when the run is completed. The system run condition can be controlled by generating a clock signal 222 and an enable signal 220 until run is complete and then to disable the clock signal 222 and the enable signal 220 after run is complete. During run, the signal source 110 is clocked to generate input signals 112 and the signature circuits 216 are clocked to update the signature numbers in response to the input signals 112. After operation is completed, the detector signal 116 is tested in operation 418 to determine if a fault has occurred. If a fault is not detected, operation proceeds along the FAULTLESS path to display the no fault condition in operation 420 and then to exit the test in operation 428. If a fault is detected, operation proceeds along the FAULT path to display the fault condition in operation 422 and to locate the fault in operations 424 and 426. In operation 424, the input signatures generated by the signature circuits 216 are compared with the related reference signatures related to faultless operation stored in memory 228 to locate the fault. The location of the fault is displayed in operation 426, such as for removal and replacement of the malfunctioning module, and then operation exits the test in operation 428.

Thus there has been disclosed a fast fault localization system that provides a new and improved way to detect and to locate events. In a preferred embodiment, an event detector and locator monitors high speed electronic digital signals as the system is operating to rapidly detect events and to locate the events. This invention is particularly suitable for rapidly detecting events substantially simultaneously with their occurrence and for instantaneously locating the event when it is detected. It can be used for fault detection and location in a performance monitoring system, target detection and location in a fire control system, reference point detection and location in a guidance and control system, and other detection and location applications.

It is to be understood that the above-described embodiments are merely illustrative of some of the many specific embodiments that represent applications of the principles of the present invention. Clearly, numerous and varied other arrangements may be designed by those skilled in the art without departing from the scope of the invention.

What is claimed is:

1. An event locating system comprising:
   an input circuit for generating a plurality of Hamming code input signals each having a sequential plurality of input signal states;
   a plurality of signature circuits each generating an input signature number in response to the sequential plurality of input signal states of a related one of the plurality of input signals generated by said input circuit;
   a reference circuit for generating a plurality of reference signature numbers;
   a comparator circuit for generating each of a plurality of comparator signals by comparing one of the input signature numbers generated by one of said plurality of signature circuits with a related one of the reference signature numbers generated by said reference circuit; and
   a location circuit for locating an event in response to the plurality of comparator signals generated by said comparator circuit.

2. The system as set forth in claim 1 above, wherein said system further comprises a detector circuit for detecting the event in response to the plurality of comparator signals generated by said comparator circuit.

3. The system as set forth in claim 1 above, wherein said system is a fault location system, wherein said location circuit is arranged for locating the event as a fault in response to the plurality of comparator signals generated by said comparator circuit.

4. The system as set forth in claim 1 above, wherein said system is a transient event location system, wherein said location circuit is arranged for locating the event as a transient event in response to the plurality of comparator signals generated by said comparator circuit.

5. The system as set forth in claim 1 above, wherein said plurality of signature circuits are arranged to provide data compression by compressing the plurality of input signals generated by said input circuit to generate the input signature numbers in compressed form.

6. An event locating system according to claim 1, wherein said location circuit further comprises a location circuit for locating an event by assigning a first state to each of said signature numbers that compares with the related reference number, by assigning a second state to each of said signature numbers that does not compare with the related reference number, and by concatenating the assigned first states and second states into a code which identifies the input signal causing the event.

7. A transient event detecting and locating system comprising:
   an input circuit for generating a plurality of Hamming code input signals each having a sequential plurality of input signal states;
   a plurality of signature circuits each generating an input signature number in response to the sequential plurality of input signal states of a related one of the plurality of input signals generated by said input circuit;
   a reference circuit for generating a plurality of reference signature numbers;
   a comparator circuit for generating each of a plurality of comparator signals by comparing one of the input signature numbers generated by one of said plurality of signature circuits with a related one of the reference signature numbers generated by said reference circuit;
   a transient event location circuit for locating a transient event in response to the plurality of comparator signals generated by said comparator circuit.

8. The system as set forth in claim 7 above, wherein said system further comprises a transient event detector circuit for detecting the transient event in response to the plurality of comparator signals generated by said comparator circuit.

9. The system as set forth in claim 7 above, wherein said system is a transient fault location system, wherein said transient event location circuit is arranged for locating the transient event as a transient fault in response to the plurality of comparator signals generated by said comparator circuit.

10. A transient event detecting and locating system according to claim 7 wherein said transient event location circuit further comprises a transient event location circuit for locating a transient event by assigning a first state to each of said signature numbers that compares with the related reference number, by assigning a second state to each of said signature numbers that does not compare with the related reference number, and by concatenating the assigned first states and second states into a code which identifies the input signal causing the transient event.

11. A detecting and locating system comprising:
   an input circuit for generating a plurality of input signals each having a sequential plurality of input signal states;
   an encoder circuit for generating a plurality of coded input signals each having a sequential plurality of input signal states by encoding the plurality of input signals generated by said input circuit, wherein the plurality of coded input signals generated by said encoder circuit is less than the plurality of input signals generated by said input circuit;
   a plurality of signature circuits each generating an input signature number in response to the sequential plurality of input signal states of a related one of the plurality of coded input signals generated by said encoder circuit;

a reference circuit for generating a plurality of reference signature numbers;

a comparator circuit for generating each of a plurality of comparator signals by comparing one of the input signature numbers generated by one of said plurality of signature circuits with a related one of the reference signature numbers generated by said reference circuit; and a location circuit for locating an event in response to the plurality of comparator signals generated by said comparator circuit.

12. The system as set forth in claim 11 above, wherein said system further comprises an event detection circuit for detecting the event in response to the plurality of comparator signals generated by said comparator circuit.

13. The system as set forth in claim 11 above, wherein said system is a fault location system, wherein said location circuit is arranged for locating the event as a fault in response to the plurality of comparator signals generated by said comparator circuit.

14. The system as set forth in claim 11 above, wherein said system is a transient event location system, wherein said location circuit is arranged for locating the event as a transient event in response to the plurality of comparator signals generated by said comparator circuit.

15. The system as set forth in claim 11 above, wherein said encoder circuit is arranged to provide data compression by compressing the plurality of input signals generated by said input circuit to generate the plurality of coded input signals in compressed form.

16. The system as set forth in claim 11 above, wherein said plurality of signature circuits are arranged to provide data compression by compressing the plurality of coded input signals generated by said encoder circuit to generate the input signature numbers in compressed form.

17. The system as set forth in claim 11 above, wherein said system is a fault detection and location system; wherein said input circuit includes a stored program digital computer for generating the plurality of input signals each having the sequential plurality of input signal states to be fault detected and located; wherein said encoder circuit includes a Hamming encoder circuit for generating a plurality of Hamming encoded input signals each having a sequential plurality of input signal states by Hamming encoding the plurality of input signals generated by said input circuit; wherein the number of the plurality of encoded input signals generated by said Hamming encoder circuits is $2^n$ times the number of the plurality of input signals generated by said input circuit; wherein each of said plurality of signature circuits includes a sixteen bit shift register circuit for shifting in a modulo two sum signal and a modulo two adder circuit for generating the modulo two sum signal by modulo two addition of selected feedback bits of said sixteen bit shift register circuit together with the related one of the plurality of encoded input signals generated by said Hamming encoder circuit; wherein said reference circuit includes a plurality of registers for generating the plurality of reference signature numbers as faultless reference signature numbers; wherein said comparator circuit includes an integrated circuit comparator for generating each of the plurality of comparator signals by comparing one of the input signature numbers generated by one of said signature circuits with a related one of the faultless reference signature numbers generated by said reference circuit; wherein said system further comprises a parity detector circuit for generating a detector signal indicative of detection of a fault in response to the plurality of comparator signals generated by said comparator circuit; and wherein said location circuit includes a fault location circuit for locating the event as a fault in response to the plurality of comparator signals generated by said comparator circuit.

18. A detecting and locating system according to claim 11 in which said location circuit further comprises a location circuit for locating an event by assigning a first state to each of said signature numbers that compares with the related reference number, by assigning a second state to each of said signature numbers that does not compare with the related reference number, and by concatenating the assigned first states and second states into a code which identifies the input signal causing the event.

19. In an electronic system generating a plurality of Hamming code electronic signals each having a sequential plurality of input signal states, the improvement comprising:

a plurality of signature circuits each generating an input signature number in response to the sequential plurality of input signal states of a related one of the plurality of Hamming code electronic signals;

a reference circuit for generating a plurality of reference signature numbers;

a comparator circuit for generating each of a plurality of comparator signals by comparing one of the input signature numbers generated by one of said plurality of signature circuits with a related one of the reference signature numbers generated by said reference circuit; and a location circuit for locating an event in response to the plurality of comparator signals generated by said comparator circuit.

20. In an electronic system according to claim 19 in which said location circuit further comprises a location circuit for locating an event by assigning a first state to each of said signature numbers that compares with the related reference number, by assigning a second state to each of said signature numbers that does not compare with the related reference number, and by concatenating the assigned first states and second states into a code which identifies the input signal causing the event.

21. In an electronic system generating a plurality of Hamming code electronic signals each having a sequential plurality of input signal states, a method comprising the steps of:

generating an input signature number in response to the sequential plurality of input signal states of each of the plurality of Hamming code electronic signals;

generating a plurality of reference signature numbers;

locating an event by comparing each of the input signature numbers with a related one of the reference signature numbers.

22. The method as set forth in claim 21 above, further comprising the step of detecting the event by comparing each of the input signature numbers with a related one of the reference signature numbers.

23. A method as set forth in claim 21 further comprising the steps of locating an event by assigning a first state to each of said signature numbers that compares with the related reference number, by assigning a second state to each of said signature numbers that does not compare with the related reference number, and by concatenating the assigned first states and second states into a code which identifies the input signal causing the event.

* * * * *